United States Patent [19]

Scheffler et al.

[11] Patent Number: 4,893,433

[45] Date of Patent: Jan. 16, 1990

[54] FISHING FLOAT

[76] Inventors: Clement J. Scheffler; Marvin L. Scheffler, both of 12233 Ann St., Blue Island, Ill. 60406

[21] Appl. No.: 313,018

[22] Filed: Feb. 21, 1989

[51] Int. Cl.$^4$ .............................................. A01K 93/00
[52] U.S. Cl. ...................................... 43/43.1; 43/44.9; 43/44.91; 43/44.92
[58] Field of Search .................. 43/43.1, 43.12, 43.14, 43/43.11, 44.87, 44.9, 44.91

[56] References Cited

U.S. PATENT DOCUMENTS

| | | | |
|---|---|---|---|
| 418,995 | 1/1890 | Tufts | 43/44.95 |
| 419,574 | 1/1890 | Vasseur . | |
| 1,176,631 | 3/1916 | Wells . | |
| 1,240,043 | 9/1917 | Gregory et al. . | |
| 1,778,119 | 1/1929 | Neville . | |
| 2,077,184 | 4/1937 | Rader et al. . | |
| 2,241,851 | 5/1941 | Gilstrap . | |
| 2,787,079 | 4/1957 | Wilson . | |
| 2,881,551 | 4/1959 | Atton . | |
| 2,881,552 | 4/1959 | Miller . | |
| 3,107,451 | 10/1963 | Sitzler et al. . | |
| 3,197,914 | 8/1965 | Beverly . | |
| 3,241,262 | 3/1966 | Beverly . | |
| 4,563,831 | 1/1986 | Gibney . | |
| 4,616,441 | 10/1986 | Dmytriw . | |

Primary Examiner—Nicholas P. Godici
Assistant Examiner—Michael William Starkweather
Attorney, Agent, or Firm—Gerlach & O'Brien

[57] ABSTRACT

A slip bobber for a fishing line includes a pair of separable parts that abut on each other at respective transverse mating surfaces to form a buoyant body. The mating surface of one of the parts has a diametral groove dimensioned for slidable reception of a fishing line. An externally-threaded post projects outwardly from this surface and has a longitudinal line-receiving slot extending transversely through the post and in register with the groove. The mating surface of the other part includes an opening in register with the post and dimensioned for receiving the post in threaded engagement for bringing the parts into abutting engagement. A resilient flexible wall preferably provides the latter mating surface and is stressed to enhance engagement and resist separation of the parts.

2 Claims, 1 Drawing Sheet

FISHING FLOAT

FIELD OF THE INVENTION

The present invention relates to fishing floats or bobbers, and more particularly to an improved slip bobber for a finishing line.

BACKGROUND OF THE INVENTION

A slip bobber is a fishing line float designed for slidable movement on the line when attached thereto. When such a bobber is used with a rod and reel, casting of the line is simplified because the bait and terminal tackle may be reeled close to the end of the rod, thereby leaving little excess line which may catch on something while casting.

Preferably, a slip bobber should be attachable to and detachable from a line at any point along its length—thus eliminating the need for time-consuming removal and/or replacement of a hook or other object from the end of the line. A number of designs for slip bobbers having the aforementioned characteristics have been described. Typical designs are disclosed in the following U.S. Patents: Wilson, U.S. Pat. No. 2,787,079; Atton, U.S. Pat. No. 2,881,551; and Sitzler et al., U.S. Pat. No. 3,107,451.

The aforementioned prior bobbers are relatively costly to manufacture, being either relatively complex in shape, or incorporating comparatively expensive components.

Some of the aforementioned bobbers rely for their operation upon structure for frictionally connecting together separate parts. These bobbers may encounter problems with accidental detachment of the bobber from the line caused by vibrations and jolts undergone by the bobber during casting the line, causing the bobber parts to separate. Also, after prolonged use of the bobber, the structure may wear sufficiently to make it ineffective for securing the parts together.

A commercially-available slip bobber which is attachable to a line at any point therealong utilizes a line-holding tube rotatably carried in a diametral bore extending through a one-piece spherical buoyant body. The bobber is attached to a line by first aligning a lengthwise slot in the tube with a slot in the body extending from the surface thereof to the bore. The line then is inserted through the aligned slots into the tube, and the line is captured in the tube by rotating the tube to dealign the openings. However, the attendant shocks and movements undergone by the bobber when fishing occasionally have been found to cause rotation of the tube back to the aligned position of the slots, thereby allowing unwanted detachment of the bobber from the line.

SUMMARY OF THE INVENTION

An important object of the invention is to provide an improved slip bobber which can be attached to a fishing line at any point therealong, and which is relatively simple and economical to manufacture and use.

Another object is to provide such a bobber which is resistant to accidental detachment from a fishing line.

Yet another object is to provide such a bobber which has a relatively long useful service life.

The invention provides a slip bobber which includes a cooperating pair of separable parts that abut on each other at respective transverse mating surfaces to form a buoyant body. A transverse groove is formed in the mating surface of one of the parts, for slidable reception of a fishing line. This part includes an externally threaded post extending outwardly from its mating surface. A longitudinal slot extends transversely through the post for its length. The slot is adapted for receiving a fishing line therein and is in register with the groove in the one part for moving a fishing line through the slot and into the groove. An opening is formed in the mating surface of the remaining one of the parts. The wall of the opening is adapted for receiving the post in the opening and in threaded engagement therewith and thereby with the remaining part, for bringing the parts into abutment, thereby to confine a fishing line in the groove.

In a preferred embodiment of th invention, the remaining part includes a resilient flexible tranverse wall having a recessed outer surface comprising the mating surface of the part, the wall being adapted for being stressed upon bringing the two parts into abutment, to produce forces resiliently urging the abutted parts toward one another and holding them together securely.

BRIEF DESCRIPTION OF THE DRAWINGS

The attached drawings illustrate a preferred embodiment of the invention, without limitation thereto. In the drawings, like element are identified by like reference symbols in each of the views.

DESCRIPTION OF THE PREFERRED EMBODIMENTS

Figure 1:
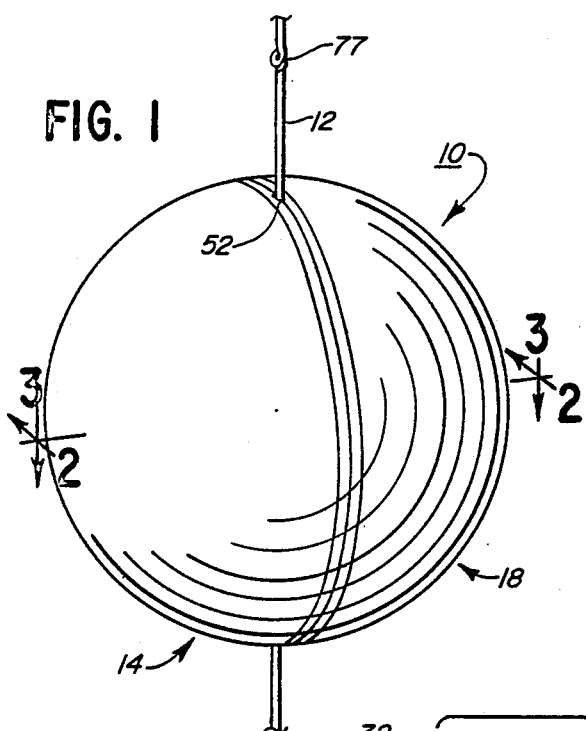
FIG. 1 is a perspective view of a slip bobber of the invention, shown mounted on a fishing line.
Figure 2:
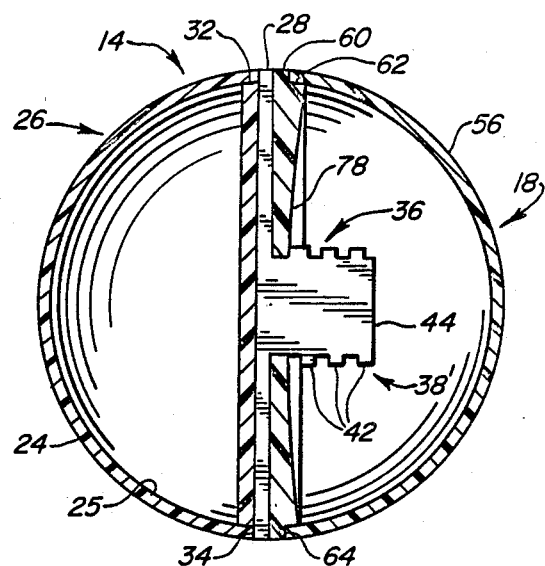
FIG. 2 is a cross-sectional view of the bobber of FIG. 1, taken substantially on line 2—2 of FIG. 1.
Figure 3:
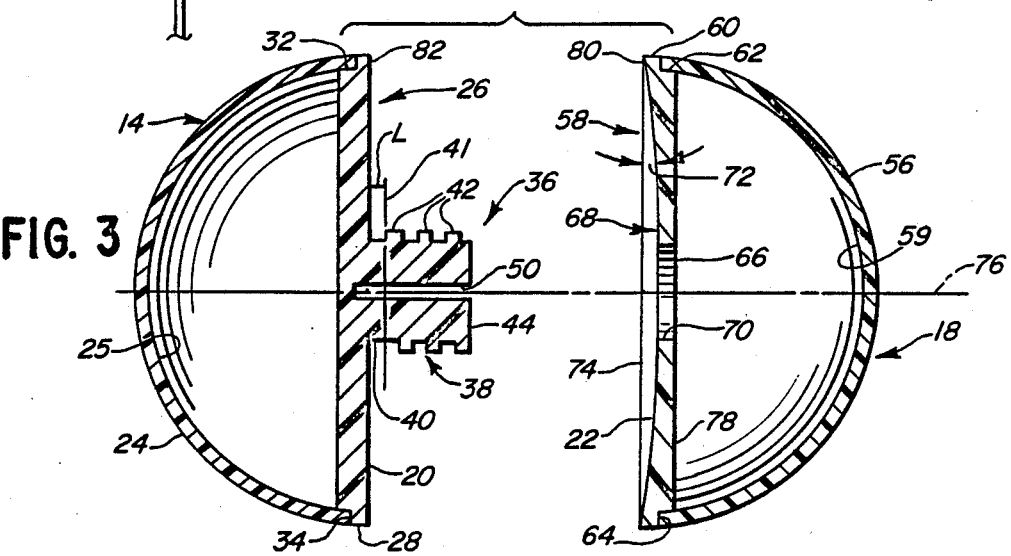
FIG. 3 is an exploded cross-sectional view of the bobber of FIG. 1, taken substantially on line 3—3 of FIG. 1.

Referring to the drawings, and particularly FIGS. 1–3, a slip bobber 10 constructed in accordance with the invention is shown attached to a fishing line 12. The bobber 10 includes two cooperating body parts: a male part 14 and female part 18. The parts may be releasably secured together, with transverse diametral mating surfaces 20 and 22, of, respectively, the male and female parts 14 and 18, brought into abutment, or face-to-face juxtaposition.

The body parts are substantially hemispherical in shape, and when mated, form a substantially spherical bobber 10. While this shape is preferred, as minimizing snagging on weeds and the like, it will be understood that the bobber may be made in any of a number of shapes.

Figure 4:
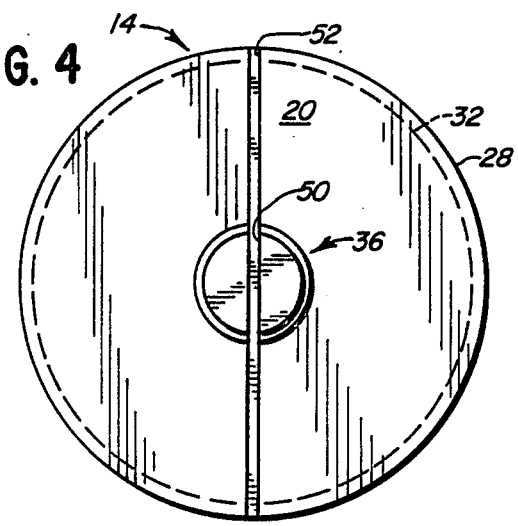
FIG. 4 is an end elevational view of a male part of the bobber of FIG. 1.
Figure 5:
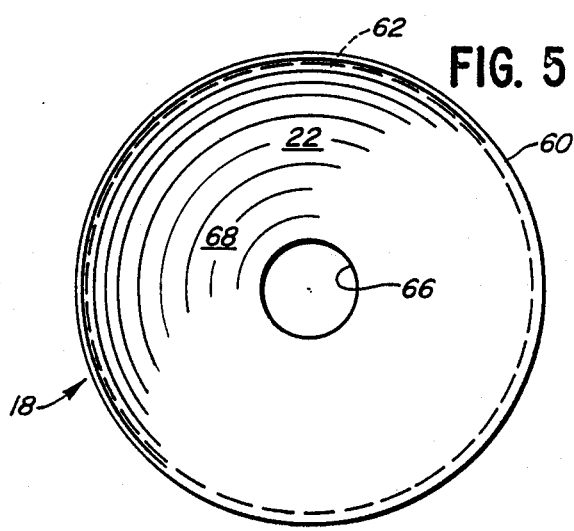
FIG. 5 is an end elevational view of a female part of the bobber of FIG. 1.

Referring to FIGS. 2–4, the male part 14 includes a hemispherical shell 24 and a male mating element 26 which sealingly fits into the open end of the shell 24, the form a buoyancy chamber 25. The male mating element 26 is generally disc-like in shape, and it includes a transverse wall having a circular front section 28 unitary with a circular rear section 32 of reduced diameter. The diameters of the front and the rear sections 28 and 32 are substantially equal to, respectively, the external and internal diameters of the hemispherical shell 24. A rear-facing annular shoulder 34 is formed at the juncture of the front section 28 and rear section 32. The rim of the shell 24 seats on the shoulder 34.

The mating surface 20 of the male mating element 26 forms the front boundary of the front section 28 and is substantially planar. A post 36 of the element 26 is centrally or axially located on the mating surface 20, is unitary therewith and projects perpendicularly outwardly therefrom. The post 36 includes a cylindrically threaded outer, distal section 38 and an unthreaded cylindrical inner, proximal or shank section 40 of reduced diameter.

The shank section 40 has a predetermined length "L" (FIG. 3), and it merges with the distal section 38 at a plane 41 sustantially parallel to the mating surface 20 and spaced the distance "L" therefrom. The distal section 38 is provided with an external thread 42 which extends rearwardly from the distal or forward end 44 of the post to the plane 41. The thread 42 preferably is a square thread.

A diametral transverse slot 50 is formed in the post 36 and extends longitudinally from the forward end 44 thereof to the mating surface 20 of the male mating element 26. The slot is dimensioned for passing a fishing line therethrough. A transverse groove 52 is formed in the mating surface 20 and registers with the slot 50. The groove 52 extends diametrically across the mating surface 20 and is dimensioned for slidable reception of a fishing line therein.

The female part 18 includes a hemispherical shell 56 and a generally disc-like female mating element 58 which sealingly fits into the open end of the shell 56 to form a buoyancy chamber 59. The female mating element 58 includes a resilient flexible transverse wall having a circular front section 60, and a circular rear section 62 of reduced diameter. The mating surface 22 of the female part 18 forms the forward boundary of the front section 60, and the surface 22 is slightly concave.

The diameters of the front and rear sections 60 and 62 of the female part 18 are substantially equal to, respectively, and external and internal diameters of the hemispherical shell 56. A rear-facing annular shoulder 64 is formed at the juncture of the front section 60 and the rear section 62. The rim of the shell 56 seats on the shoulder 64.

A generally circular aperture or opening 66 is formed in a central portion 68 of the female mating element 58, coaxially with the element. The aperture 66 is dimensioned for receiving the thread 42 of the post 36 therethrough, in threaded engagement with the element 58. An internal thread 70, complementary to the post thread 42, may be formed in the wall of the aperture, to assist in providing the threaded engagement.

In a preferred embodiment, the thickness of the central portion 68 is made equal to or less than, the length "L" of the proximal section 40 of the post 36.

As best seen in FIG. 3, the mating element 58 of the female part 18 in its unstrained, or rest state is concave, with its mating surface 22 included inwardly and rearwardly at an angle 72 from a diametral plane 74 perpendicular to an axis 76 constituting the axis of the aperture 66. The angle 72 preferably is from 5° to 10°. In the illustrative preferred embodiment of the invention, at least the central portion 68, more preferably the entire mating element 58, is formed of a resilient material.

The preferred material of construction for the male part 14 is a rigid or semi-rigid plastic material such as, e.g., polystyrene, polyethylene, or polypropylene. It is also preferred that the female part 18 be constructed of such a plastic material. The mating element 58 of the female part 18 preferably is made of a resilient plastic, such as polyethylene or polypropylene. It will be apparent, however, that other materials of construction may be employed.

In a preferred method of manufacture, the hemispherical shells 24 and 56 (which are identical in shape and dimension), the male mating element 26, and the female mating element 58 are formed from plastic by conventional techniques, such as injection molding.

The male and female parts 14 and 18 are assembled by inserting the respective rear sections 32 and 62 of the mating elements 26 and 58 into the corresponding hemispherical shells 24 and 56. The annular shoulders 34 and 64 of the mating elements 26 and 58 abut the outer circumferential edges of hemispherical shells 24 and 56, respectively. The mating elements preferably are permanently secured to the shells to form watertight seals by adhesives, solvent welding, ultrasonic welding or other suitable means.

Slip bobbersmay be constructed in a variety of sizes in accordance with the invention, and may have slots 50 and grooves 52 of various dimensions, to accomodate various line sizes and usages. As previously noted, the shape of the bobber is not critical to the operation of the invention, although a smooth external surface is preferred.

To attach the slip bobber 10 of the invention to a fishing line 12, and with the parts 14 and 18 separated, the user places the fishing line 12 in the slot 50 of the post 36 and moves the line toward and into the groove 52. The female part 18 is secured to the male part 14 by aligning the aperture 66 in the female part with the post 36 of the male part, and rotating the female part on the post so as to threadedly engage the post with the mating element 58, in the aperture 66, until the mating surface 20 of the male part and the mating surface 22 of the female part are juxtaposed. The groove 52 is dimensioned to permit slidable movement of the fishing line 12 therein when the respective mating surfaces are juxtaposed.

The length of the portion of the line 12 suspended beneath the surface of the water during use of the bobber is governed by a conventional stop 77, such as a bead or other obstruction to movement of the bobber, placed on the line 12 between the bobber 10 and a fishing rod.

As best seen in FIG. 2, the male and female parts 14 and 18 are so dimensioned that when the mating surfaces 20 and 22 are juxtaposed, the central portion 68 of the female mating element 58 will not be on the thread 42 of the post 36, but will have run off the thread and will be disposed around the cylindrical proximal section 40 of the post. The attainment of this condition will be evidenced by the female part 18 "free wheeling": it will be rotatable about the post 36 without advancing further forward.

Owing to the concave shape of the female mating element 58, as the female part 18 is threadably engaged on the post 36 of the male part 14, a forward circumferential edge portion 80 of the female mating element will be the first portion thereof to abut on the male mating element 26 at a forward circumferential edge portion 82 thereof. As the threaded engagement is continued, the central portion 68 of the female mating element is strained or flexed, forwardly towards the male element 26, the female part then "free wheels" on the proximal Section 40 of the post 36 as the wall portion 68 is captured by the distal section 38, and the mating surfaces 22 and 20 on the respective female and male elements are closely juxtaposed.

As a consequence of the resilient character of the female mating element 58, the straining thereof results in forces acting rearwardly and forwardly. The rear wall surface 78 of the female mating element exerts a rearwardly-directed force against the rear, or inner, termination of the thread 42, whose square form provides a maximum of reaction surface for this force to act upon. A forwardly-directed force, maximal at the forward circumferential edge portion 80 of the female mating element, urges this edge portion into tight abutment with the forward circumferential edge portion 82 of the male mating element 26.

The structure of the preferred embodiment minimizes unwanted detachment of the bobber 10 from a fishing line owing to separation of the male and female parts 14 and 18, induced by shocks and vibrations encountered during fishing. Thus, the positive engagement of the rear wall surface 78 of the female mating element 58 with the inner termination of the thread 42 and the absence of threaded engagement in the "free wheeling" condition enable the abutted female and male parts to withstand incidental separating forces acting generally either colinearly with, or perpendicular to, the axis 76 of the aperture 66. Also, the structure minimizes the effect of thread wear, in utilizing the resilient force to hold the parts in engagement.

The force-maintained close contact of the respective circumferential edge portions 80 and 82 lessens the likelihood of the fishing line 12 escaping from the groove 52 and sliding between the mating surfaces of the male and female parts, with attendant loss of the "slip" feature of the bobber. Also, the close contact of the edge portions 80 and 82 seals the bobber from ingress of water into the chamber 59 of the female part 18.

While a preferred embodiment of the slip bobber of the invention has been described and illustrated, it will be apparent to those skilled in the art that various changes and modifications may be made therein within the spirit and scope of the invention. It is intended that all such changes and modifications be included within the scope of the claims.

We claim:

1. A slip bobber for a fishing line comprising:
   a pair of separable parts that abut on each other at respective transverse mating surfaces thereof to form a buoyant body;
   means forming a transverse groove in the mating surface of one of said parts for slidable reception of a fishing line therein;
   said one part including an externally threaded post projecting outwardly from its mating surface;
   means forming a longitudinal slot extending transversely through said post for the length of the post and adapted for receiving a fishing line in the slot, said slot registering with said groove for moving a fishing line through the slot and into the groove;
   the remaining one of said parts including a resilient flexible transverse wall having a recessed outer surface comprising the mating surface of the part;
   means forming an opening in said remaining part wall in register with said post and adapted for receiving the post in the opening in threaded engagement with said wall for bringing said parts into abutment, thereby to confine a fishing line in said groove; and
   said remaining part wall being adapted for being stressed by engagement of said post therewith upon said bringing said parts into abutment, thereby to produce a force deforming said transverse wall wherein it becomes substantially planar and the force resiliently urges the abutted parts toward one another.

2. A bobber as defined in claim 1 wherein said opening extends through said wall, said post includes an outer externally threaded distal section and an adjacent inner unthreaded proximal section of reduced diameter adjacent also to the mating surface of said one part, and said opening-forming means is adapted for threadedly inserting said distal section through the opening and then receiving said proximal section within the opening and enclosed by the wall, thereby to bring said parts into abutment with the wall captured by said distal section.

* * * * *